US012747174B2

(12) United States Patent
Zhang et al.

(10) Patent No.: US 12,747,174 B2
(45) Date of Patent: Sep. 29, 2026

(54) METHOD AND SYSTEM FOR CONTINUOUS-FLOW AEROBIC GRANULAR SLUDGE PROCESS WITH IMPROVED TWO-STAGE SEDIMENTATION

(71) Applicant: Passavant Roediger Water Technologies (Hangzhou) Co., Ltd., Hangzhou (CN)

(72) Inventors: Jiansan Zhang, Hangzhou (CN); Jun Li, Hangzhou (CN)

(73) Assignee: Passavant Roediger Water Technologies (Hangzhou) Co., Ltd., Hangzhou (CN)

( * ) Notice: Subject to any disclaimer, the term of this patent is extended or adjusted under 35 U.S.C. 154(b) by 321 days.

(21) Appl. No.: 18/287,312

(22) PCT Filed: May 6, 2022

(86) PCT No.: PCT/CN2022/091329
§ 371 (c)(1),
(2) Date: Oct. 18, 2023

(87) PCT Pub. No.: WO2022/233331
PCT Pub. Date: Nov. 10, 2022

(65) Prior Publication Data

US 2024/0190738 A1 Jun. 13, 2024

(30) Foreign Application Priority Data

May 7, 2021 (CN) ......................... 202110493015.6
May 7, 2021 (CN) ......................... 202120953416.0

(51) Int. Cl.
*C02F 3/12* (2023.01)
*C02F 1/52* (2023.01)
*C02F 1/00* (2023.01)

(52) U.S. Cl.
CPC ...... *C02F 3/1215* (2013.01); *C02F 2001/007* (2013.01); *C02F 1/52* (2013.01);
(Continued)

(58) Field of Classification Search
CPC .. C02F 3/1215; C02F 1/52; C02F 3/12; C02F 2001/007; C02F 2203/006; C02F 2301/046; Y02W 10/10
(Continued)

(56) References Cited

U.S. PATENT DOCUMENTS

2010/0133199 A1* 6/2010 Ochiai ................ B01D 21/245 210/709
2020/0002201 A1 1/2020 Stinson et al.
2021/0002154 A1 1/2021 Trivedi et al.

FOREIGN PATENT DOCUMENTS

CN 1412133 A 4/2003
CN 202297281 U 7/2012
(Continued)

OTHER PUBLICATIONS

Machine-generated English translation of JP 4495910, generated on Jan. 20, 2026.*
(Continued)

*Primary Examiner* — Fred Prince
(74) *Attorney, Agent, or Firm* — Bayramoglu Law Offices LLC

(57) ABSTRACT

A method and a system for a continuous-flow aerobic granular sludge (AGS) process with improved two-stage sedimentation are provided. The method includes the following steps: arranging a biochemical reaction tank, a granular sludge sedimentation tank, and an inclined plate sedimentation tank that are connected sequentially, and arranging an inclined device in the inclined plate sedimentation tank; allowing sewage to continuously flow into the
(Continued)

biochemical reaction tank, and allowing a sludge-water mixture obtained after a biochemical reaction to enter the granular sludge sedimentation tank, such that heavy sludge in the sludge-water mixture is quickly settled in the granular sludge sedimentation tank and returned to the biochemical reaction tank; and allowing light flocculent sludge in the sludge-water mixture to flow into the inclined plate sedimentation tank.

7 Claims, 2 Drawing Sheets

(52) U.S. Cl.
CPC .......... *C02F 3/12* (2013.01); *C02F 2203/006* (2013.01); *C02F 2301/046* (2013.01); *Y02W 10/10* (2015.05)

(58) Field of Classification Search
USPC ............. 210/623, 631, 189.1, 207, 252, 259
See application file for complete search history.

(56) References Cited

FOREIGN PATENT DOCUMENTS

| | | | | | |
|---|---|---|---|---|---|
| CN | 103395947 | A | | 11/2013 | |
| CN | 103408194 | A | | 11/2013 | |
| CN | 203392987 | U | | 1/2014 | |
| CN | 106145326 | A | | 11/2016 | |
| CN | 106167340 | A | | 11/2016 | |
| CN | 106430547 | A | | 2/2017 | |
| CN | 205973962 | U | | 2/2017 | |
| CN | 106746363 | A | | 5/2017 | |
| CN | 107129119 | A | | 9/2017 | |
| CN | 111467845 | A | | 7/2020 | |
| CN | 113149194 | A | | 7/2021 | |
| CN | 215209006 | U | | 12/2021 | |
| JP | 2007136369 | A | | 6/2007 | |
| JP | 4495910 | B2 | * | 7/2010 | ......... B01D 21/0039 |
| KR | 20130104519 | A | | 9/2013 | |
| KR | 20210009111 | A | | 1/2021 | |

OTHER PUBLICATIONS

Machine-generated English translation of CN 106430547, generated on Jan. 20, 2026.*
Machine-generated English translation of CN 203392987, generated on Jan. 20, 2026.*
Roza Tarpagkou, et al., The influence of lamellar settler in sedimentation tanks for potable water treatment—A computational fluid dynamic study, Powder Technology, 2014, pp. 139-149, vol. 268.
Dong Xu, et al., Rapid aerobic sludge granulation in an integrated oxidation ditch with two-zone clarifiers, Water Research, 2020, pp. 1-11, vol. 175.
Li Juansheng, et al., Environmental Engineering Fundamentals, Wuhan University of Technology Press, 2009, pp. 45-46.
Song Zhiwei, et al., Water Pollution Control Engineering, China University of Mining and Technology Press, 2013, pp. 340-341.

* cited by examiner

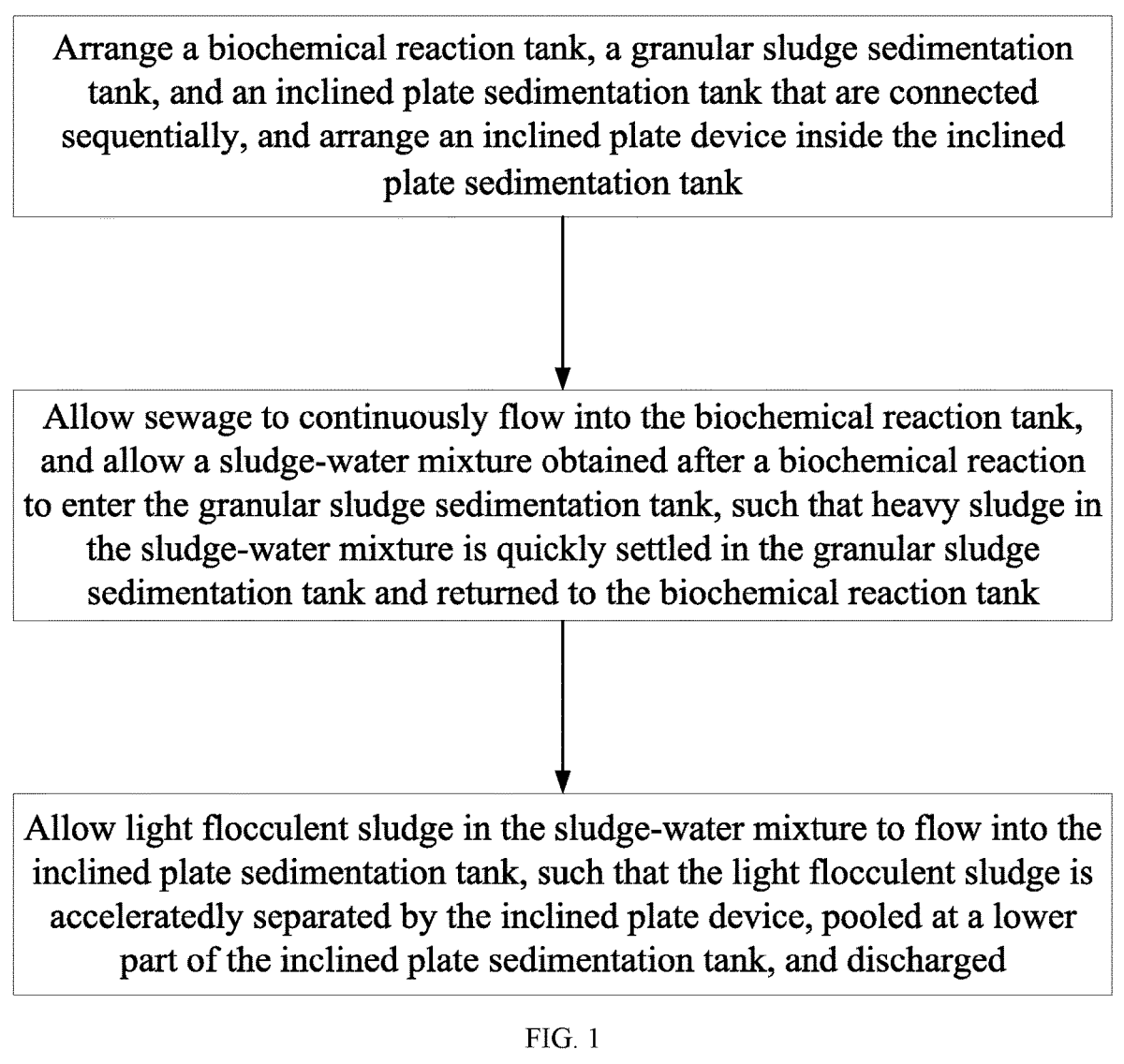

Arrange a biochemical reaction tank, a granular sludge sedimentation tank, and an inclined plate sedimentation tank that are connected sequentially, and arrange an inclined plate device inside the inclined plate sedimentation tank

↓

Allow sewage to continuously flow into the biochemical reaction tank, and allow a sludge-water mixture obtained after a biochemical reaction to enter the granular sludge sedimentation tank, such that heavy sludge in the sludge-water mixture is quickly settled in the granular sludge sedimentation tank and returned to the biochemical reaction tank

↓

Allow light flocculent sludge in the sludge-water mixture to flow into the inclined plate sedimentation tank, such that the light flocculent sludge is acceleratedly separated by the inclined plate device, pooled at a lower part of the inclined plate sedimentation tank, and discharged

FIG. 1

METHOD AND SYSTEM FOR CONTINUOUS-FLOW AEROBIC GRANULAR SLUDGE PROCESS WITH IMPROVED TWO-STAGE SEDIMENTATION

CROSS REFERENCE TO THE RELATED APPLICATIONS

This application is the national phase entry of International Application No. PCT/CN2022/091329, filed on May 6, 2022, which is based upon and claims priority to Chinese Patent Application No. 202110493015.6, filed on May 7, 2021; and Chinese Patent Application No. 202120953416.0, filed on May 7, 2021, the entire contents of which are incorporated herein by reference.

TECHNICAL FIELD

The present disclosure relates to a method and system for an aerobic granular sludge (AGS) process with improved sedimentation and in particular to a method and system for a continuous-flow AGS process with improved two-stage sedimentation, and belongs to the field of sewage treatment.

BACKGROUND

The AGS technology is a novel wastewater treatment technology, which has characteristics such as excellent sedimentation performance, high sludge concentration, and excellent acceptance for high organic loadings, toxic and harmful substances, shock loadings, and the like. The AGS technology is receiving increasing attention in the field of wastewater treatment. AGS is produced through complicated mechanisms, including physical, chemical, and biological interactions. Generally, the production of AGS can be regarded as the accumulation of biomasses due to self-fixation of microorganisms under specified conditions such as hydrodynamics and selective pressure.

The current research has shifted from the cultivation of AGS in a sequencing batch reactor (SBR) to the production of AGS in a continuous feed mode. For example, inventions such as "Radial-Flow Dual-Zone Sedimentation Tank for Continuous-Flow Aerobic Granular Sludge (AGS)" (Application No. 201610576528.2), "Anaerobic-Anoxic-Oxic (AAO) Process and System for Denitrification and Phosphorus Removal with Continuous-Flow Aerobic Granular Sludge (AGS)" (Application No. 201610708786.1), "Aerobic Granular Sludge (AGS) Device with Adjustable Two-Stage Sedimentation Tank" (Application No. 201610596867.7), and "Method and System for Cultivation and Particle Size Control of Continuous-Flow Aerobic Granular Sludge (AGS)" (Application No. 201710075411.0) disclose novel solutions. However, there is no report on a process of promoting clarification and separation of surplus sludge based on an inclined plate shallow sedimentation principle during production of AGS through two-stage sedimentation.

The current research has shown that the AGS method, as an extension and improvement of the current widely-used activated sludge method, has an excellent and stable total nitrogen removal effect and can significantly reduce the yield of surplus sludge. However, the phosphorus removal mechanism is relatively complicated. There is a specified contradiction between the optimization conditions of particle growth and the typical growth environment requirements of phosphate-accumulating microorganisms, which cannot meet the increasing effluent requirements, especially for total phosphorus content. At the biological treatment stage, the simultaneous addition of a chemical coagulant affects the production conditions of granular sludge and the total nitrogen treatment effect. Subsequent treatment measures with a chemical coagulant, such as high-efficiency precipitation and coagulation-filtration, significantly increase the engineering investment, and cause new sludge types and sludge generation points, which increases the difficulty and cost of subsequent sludge treatment procedures.

SUMMARY

A first objective of the present disclosure is to provide a method for a continuous-flow AGS process with improved two-stage sedimentation, such as to allow a high final suspended solid removal rate and solve the problems in the background.

A second objective of the present disclosure is to provide a system for a continuous-flow AGS process with improved two-stage sedimentation, such as to allow a high final suspended solid removal rate and a small floor space.

The present disclosure solves the technical problems with the following technical solutions:

A method for a continuous-flow AGS process with improved two-stage sedimentation is provided, including the following steps:

(1) arranging a biochemical reaction tank, a granular sludge sedimentation tank, and an inclined plate sedimentation tank that are connected sequentially, and arranging an inclined device inside the inclined plate sedimentation tank;

(2) allowing sewage to continuously flow into the biochemical reaction tank, and allowing a sludge-water mixture obtained after a biochemical reaction to enter the granular sludge sedimentation tank, such that heavy sludge in the sludge-water mixture is quickly settled in the granular sludge sedimentation tank and returned to the biochemical reaction tank; and (3) allowing light flocculent sludge in the sludge-water mixture in step (2) to flow into the inclined plate sedimentation tank, such that the light flocculent sludge is acceleratedly separated by the inclined device, pooled at a lower part of the inclined plate sedimentation tank, and discharged.

Preferably, in step (1), the inclined device is arranged at a middle part of the inclined plate sedimentation tank.

Preferably, in step (1), the inclined device includes a plurality of inclined plates arranged in parallel.

Preferably, the plurality of inclined plates are engineering plastic plates or stainless steel plates.

Preferably, the plurality of inclined plates are polypropylene (PP) plates.

Preferably, in step (1), the inclined device includes a plurality of inclined pipes arranged in parallel.

Preferably, in step (2), a sludge return pipe communicating with the biochemical reaction tank is provided at a bottom of the granular sludge sedimentation tank.

Preferably, in step (3), an agent-feeding device communicating with a front end of the inclined plate sedimentation tank is provided outside the inclined plate sedimentation tank, and when the light flocculent sludge in the sludge-water mixture in step (2) is allowed to flow into the inclined plate sedimentation tank, a coagulant is fed in the front of the inclined plate sedimentation tank through the agent-feeding device.

A system for a continuous-flow AGS process with improved two-stage sedimentation is provided, including a biochemical reaction tank, a granular sludge sedimentation tank, and an inclined plate sedimentation tank that are arranged sequentially, where a sludge return pipe communicating with the biochemical reaction tank is provided at a bottom of the granular sludge sedimentation tank, and an inclined device configured to promote polymerization of tiny flocculent suspended matters into large flocs is provided inside the inclined plate sedimentation tank.

Preferably, the inclined device includes a plurality of inclined plates arranged in parallel, an inclined direction of each of the plurality of inclined plates is oriented towards an effluent direction of the inclined plate sedimentation tank, and a clarification-separation zone is formed among the plurality of inclined plates.

Preferably, the inclined device includes a plurality of inclined pipes arranged in parallel, an inclined direction of each of the plurality of inclined pipes is oriented towards an effluent direction of the inclined plate sedimentation tank, and a clarification-separation zone is formed among the plurality of inclined pipes.

Preferably, the plurality of inclined plates are engineering plastic plates or stainless steel plates.

Preferably, the plurality of inclined plates are PP plates.

Preferably, an agent-feeding port is formed at a top of the inclined plate sedimentation tank, and an agent-feeding device communicating with the agent-feeding port is provided outside the inclined plate sedimentation tank.

Preferably, a plurality of vertical plates are provided inside the inclined plate sedimentation tank, the plurality of vertical plates are arranged below the agent-feeding port, the plurality of vertical plates and a wall of the inclined plate sedimentation tank enclose agent mixing zones, and the agent mixing zones are located at a front part of the inclined device.

Preferably, a corresponding agent-feeding port is formed above each of the agent mixing zones.

Preferably, a surplus sludge discharge port configured to discharge surplus sludge in a system is provided at a bottom of the inclined plate sedimentation tank.

The present disclosure has the following beneficial effects:

In the method for a continuous-flow AGS process with improved two-stage sedimentation of the present disclosure, the particle accumulation of aerobic sludge is conducted in a continuous flow mode; the granular sludge sedimentation tank and the inclined plate sedimentation tank are arranged to separate heavy sludge and discharge light sludge flocs out of a system, thereby promoting the production of AGS; and the arrangement of the inclined device greatly shortens a separation time of light sludge, and the inclined device has no transmission component, which leads to a simple process flow, economy, and energy conservation. In addition, there is only one surplus sludge generation point in the entire method, which is convenient for management and operation.

BRIEF DESCRIPTION OF THE DRAWINGS

To describe the technical solutions in the embodiments of the present disclosure or in the prior art clearly, the accompanying drawings required for describing the embodiments or the prior art will be briefly described below. Apparently, the accompanying drawings in the following description merely show the embodiments of the present disclosure, and those of ordinary skill in the art can still derive other accompanying drawings from the provided accompanying drawings without creative efforts.

FIG. 1 is a schematic flow chart of the method for a continuous-flow AGS process with improved two-stage sedimentation in the present disclosure;

Figure 2:
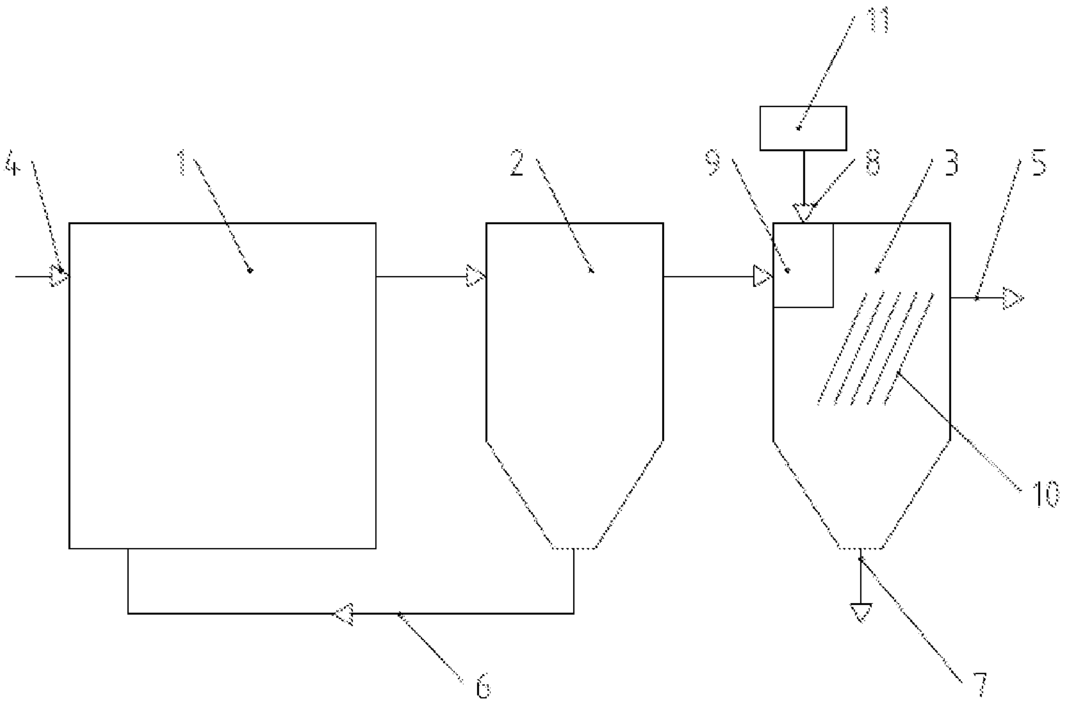
FIG. 2 is a schematic structural diagram of an embodiment of the system for a continuous-flow AGS process with improved two-stage sedimentation in the present disclosure.

Reference numerals: 1: biochemical reaction tank, 2: granular sludge sedimentation tank, 3: inclined plate sedimentation tank, 4: system water inlet, 5: system water outlet, 6: sludge return pipe, 7: surplus sludge discharge port, 8: agent-feeding port, 9: agent mixing zone, 10: inclined device, 11: agent-feeding device, 12: vertical plate, and 13: clarification-separation zone.

DETAILED DESCRIPTION OF THE EMBODIMENTS

The technical solutions of the present disclosure are further specifically described below with reference to the specific embodiments and accompanying drawings. It should be understood that the implementation of the present disclosure is not limited to the following embodiments, and any variation and/or modification made to the present disclosure will fall within the protection scope of the present disclosure.

In the present disclosure, unless otherwise specified, all parts and percentages are units of weight, and all equipment and raw materials used may be purchased from the market or commonly used in the art. All methods in the following embodiments are conventional methods in the art, unless otherwise specified. Unless otherwise specified, the components or devices in the following embodiments are general standard components or components known to those skilled in the art; and structures and principles of these components or devices can be known by those skilled in the art through technical manuals or through conventional experimental methods.

An embodiment of the present disclosure discloses a method for a continuous-flow AGS process with improved two-stage sedimentation, as shown in FIG. 1, including the following steps:

(1) a biochemical reaction tank, a granular sludge sedimentation tank, and an inclined plate sedimentation tank that are connected sequentially are arranged, and an inclined device is arranged inside the inclined plate sedimentation tank;

(2) sewage is allowed to continuously flow into the biochemical reaction tank, and a sludge-water mixture obtained after a biochemical reaction is allowed to enter the granular sludge sedimentation tank, such that heavy sludge in the sludge-water mixture is quickly settled in the granular sludge sedimentation tank and returned to the biochemical reaction tank; and (3) light flocculent sludge in the sludge-water mixture in step (2) is allowed to flow into the inclined plate sedimentation tank, such that the light flocculent sludge is acceleratedly separated by the inclined device, pooled at a lower part of the inclined plate sedimentation tank, and discharged.

Through the above technical solution, the particle accumulation of aerobic sludge is conducted in a continuous flow mode; and the granular sludge sedimentation tank and the inclined plate sedimentation tank are arranged to separate heavy sludge and discharge light sludge flocs, thereby promoting the production of AGS. The arrangement of the inclined device in the inclined plate sedimentation tank can greatly shorten a separation time of light sludge, increase a hydraulic load of a sedimentation zone, reduce a floor space, and enhance a separation effect. The inclined device has no transmission component, which leads to a simple process flow, economy, and energy conservation.

Another embodiment of the present disclosure discloses a method for a continuous-flow AGS process with improved two-stage sedimentation, including the following steps:

(1) a biochemical reaction tank, a granular sludge sedimentation tank, and an inclined plate sedimentation tank that are connected sequentially are arranged, and an inclined device is arranged inside the inclined plate sedimentation tank;

(2) sewage is allowed to continuously flow into the biochemical reaction tank, a sludge-water mixture obtained after a biochemical reaction is allowed to enter the granular sludge sedimentation tank, and because a sludge return pipe communicating with the biochemical reaction tank is provided at a bottom of the granular sludge sedimentation tank, heavy sludge in the sludge-water mixture is quickly settled in the granular sludge sedimentation tank and returned to the biochemical reaction tank; and (3) light flocculent sludge in the sludge-water mixture in step (2) is allowed to flow into the inclined plate sedimentation tank, and because an agent-feeding device communicating with a front end of the inclined plate sedimentation tank is provided outside the inclined plate sedimentation tank, a coagulant is added in the front of the inclined plate sedimentation tank through the agent-feeding device, such that the light flocculent sludge is acceleratedly separated by the inclined device, pooled at a lower part of the inclined plate sedimentation tank, and discharged.

An embodiment of the present disclosure discloses a system for a continuous-flow AGS process with improved two-stage sedimentation, as shown in FIG. 2, including biochemical reaction tank 1, granular sludge sedimentation tank 2, and inclined plate sedimentation tank 3 that are arranged sequentially, where system water inlet 4 is formed on the biochemical reaction tank, and system water outlet 5 is formed on the inclined plate sedimentation tank; sludge return pipe 6 communicating with the biochemical reaction tank is provided at a bottom of the granular sludge sedimentation tank, and surplus sludge discharge port 7 configured to discharge surplus sludge in a system is provided at a bottom of the inclined plate sedimentation tank; and inclined device 10 configured to promote polymerization of tiny flocculent suspended matters into large flocs is provided inside the inclined plate sedimentation tank.

The inclined device includes a plurality of inclined plates arranged in parallel, an inclined direction of each of the plurality of inclined plates is oriented towards an effluent direction of the inclined plate sedimentation tank, namely, the system water outlet 5, and clarification-separation zone 13 is formed among the plurality of inclined plates. The plurality of inclined plates are PP plates, and it should be noted that the plurality of inclined plates are not limited to the PP plates and other engineering plastic plates or stainless steel plates can be selected according to process requirements. Agent-feeding port 8 is formed at a top of the inclined plate sedimentation tank, and agent-feeding device 11 communicating with the agent-feeding port is provided outside the inclined plate sedimentation tank. A plurality of vertical plates 12 are provided inside the inclined plate sedimentation tank, the plurality of vertical plates are arranged below the agent-feeding port, the plurality of vertical plates and a wall of the inclined plate sedimentation tank enclose agent mixing zones 9, and the agent mixing zones are located at a front part of the inclined device.

A working process of the system is as follows: sewage is allowed to continuously flow into the biochemical reaction tank, a sludge-water mixture obtained after a biochemical reaction is allowed to enter the granular sludge sedimentation tank, and because a sludge return pipe communicating with the biochemical reaction tank is provided at a bottom of the granular sludge sedimentation tank, heavy sludge in the sludge-water mixture is quickly settled in the granular sludge sedimentation tank and returned to the biochemical reaction tank; and light flocculent sludge in the sludge-water mixture is allowed to flow into the inclined plate sedimentation tank, and a coagulant is added in the front of the inclined plate sedimentation tank through the agent-feeding device, such that the light flocculent sludge is acceleratedly separated by the inclined device, pooled at a lower part of the inclined plate sedimentation tank, and discharged.

Figure 3:
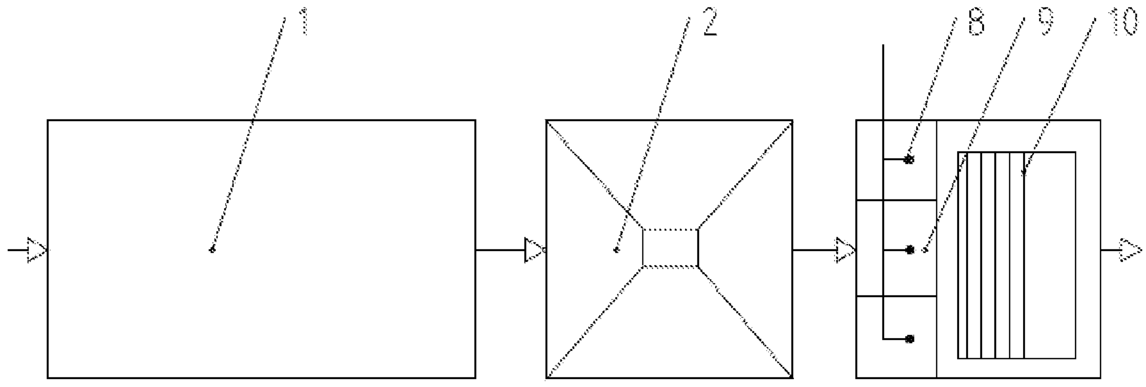
FIG. 3 is a schematic structural diagram of another embodiment of the system for a continuous-flow AGS process with improved two-stage sedimentation in the present disclosure.

In another embodiment, as shown in FIG. 3, the inclined device includes a plurality of inclined pipes arranged in parallel, an inclined direction of the plurality of inclined pipes is oriented towards an effluent direction of the inclined plate sedimentation tank, and a clarification-separation zone is formed among the plurality of inclined pipes. A corresponding agent-feeding port is formed above each of the agent mixing zones.

Through the above technical solution, the particle accumulation of aerobic sludge is conducted in a continuous flow mode; and the granular sludge sedimentation tank and the inclined plate sedimentation tank are arranged to separate heavy sludge and discharge light sludge flocs, thereby promoting the production of AGS. The arrangement of the inclined device in the inclined plate sedimentation tank can greatly shorten a separation time of light sludge, increase a hydraulic load of a sedimentation zone, reduce a floor space, and enhance a separation effect. The inclined device has no transmission component, which leads to a simple process flow, economy, and energy conservation. In addition, because surplus sludge is separately settled and discharged in the inclined plate sedimentation tank and chemical sludge generated due to agent feeding will also be directly discharged out of a system along with the surplus sludge settled separately, sludge and sewage including the residual chemical agent will not flow back to the biological reaction system, and thus will not produce any negative impact. In addition, there is only one surplus sludge generation point in the entire solution, which is convenient for management and operation.

The above embodiments are merely preferred solutions of the present disclosure and are not intended to limit the present disclosure in any form, and other variations and modifications may be made without departing from the technical solutions of the present disclosure as set forth in the appended claims.

What is claimed is:

1. A method for a continuous-flow aerobic granular sludge (AGS) process with an improved two-stage sedimentation, comprising the following steps:

(1) arranging a biochemical reaction tank, a granular sludge sedimentation tank, and an inclined plate sedimentation tank, wherein the biochemical reaction tank, the granular sludge sedimentation tank, and the inclined plate sedimentation tank are separate tanks connected sequentially, and arranging an inclined device inside the inclined plate sedimentation tank;

(2) allowing sewage to continuously flow into the biochemical reaction tank, and allowing a sludge-water mixture obtained after a biochemical reaction to enter the granular sludge sedimentation tank, wherein a sludge return pipe communicating with the biochemical reaction tank is provided at a bottom of the granular sludge sedimentation tank, and heavy sludge in the sludge-water mixture is settled in the granular sludge sedimentation tank and returned to the biochemical reaction tank; and (3) allowing light flocculent sludge in the sludge-water mixture in step (2) to flow into the inclined plate sedimentation tank and adding a chemical coagulant in the front of the inclined plate sedimentation tank through an agent-feeding device communicating with a front end of the inclined plate sedimentation tank, wherein the light flocculent sludge is separated by the inclined device, pooled at a lower part of the inclined plate sedimentation tank, and discharged out of the system through a surplus sludge discharge port at a bottom of the inclined plate sedimentation tank.

2. The method for the continuous-flow AGS process with the improved two-stage sedimentation according to claim 1, wherein in step (1), the inclined device is arranged at a middle part of the inclined plate sedimentation tank.

3. The method for the continuous-flow AGS process with the improved two-stage sedimentation according to claim 1, wherein in step (1), the inclined device comprises a plurality of inclined plates or inclined pipes arranged in parallel.

4. The method for the continuous-flow AGS process with the improved two-stage sedimentation according to claim 3, wherein the plurality of inclined plates are engineering plastic plates or stainless steel plates.

5. The method for the continuous-flow AGS process with the improved two-stage sedimentation according to claim 3, wherein the plurality of inclined plates are polypropylene (PP) plates.

6. A system for a continuous-flow AGS process with an improved two-stage sedimentation, comprising a biochemical reaction tank, a granular sludge sedimentation tank, and an inclined plate sedimentation tank, wherein the biochemical reaction tank, the granular sludge sedimentation tank, and the inclined plate sedimentation tank are separate tanks arranged sequentially, wherein a sludge return pipe communicating with the biochemical reaction tank is provided at a bottom of the granular sludge sedimentation tank, a surplus sludge discharge port configured to discharge surplus sludge out of the system is provided at a bottom of the inclined plate sedimentation tank, and an inclined device is provided inside the inclined plate sedimentation tank, wherein the inclined device is configured to promote polymerization of flocculent suspended particles into relatively larger flocs.

7. The system for the continuous-flow AGS process with the improved two-stage sedimentation according to claim 6, wherein the inclined device comprises a plurality of inclined plates or inclined pipes arranged in parallel, an inclined direction of each of the plurality of inclined plates or inclined pipes is oriented towards an effluent direction of the inclined plate sedimentation tank, and a clarification-separation zone is formed among the plurality of inclined plates or inclined pipes;

an agent-feeding port is formed at a top of the inclined plate sedimentation tank, and an agent-feeding device communicating with the agent-feeding port is provided outside the inclined plate sedimentation tank;

a plurality of vertical plates are provided inside the inclined plate sedimentation tank, the plurality of vertical plates are arranged below the agent-feeding port, the plurality of vertical plates and a wall of the inclined plate sedimentation tank enclose agent mixing zones, and the agent mixing zones are located at a front part of the inclined device;

a corresponding agent-feeding port is formed above each of the agent mixing zones; and a surplus sludge discharge port configured to discharge surplus sludge in a system is provided at a bottom of the inclined plate sedimentation tank.

* * * * *